(12) United States Patent
Lee et al.

(10) Patent No.: US 8,212,766 B2
(45) Date of Patent: Jul. 3, 2012

(54) BACKLIGHT UNIT AND DISPLAY DEVICE

(75) Inventors: Kum Tae Lee, Seoul (KR); Min Sang Kim, Seoul (KR); Moon Jeong Kim, Seoul (KR); Sung Yong Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/087,421

(22) Filed: Apr. 15, 2011

(65) Prior Publication Data

US 2011/0241980 A1     Oct. 6, 2011

(30) Foreign Application Priority Data

May 4, 2010  (KR) ................... 10-2010-0041816

(51) Int. Cl.
*G09G 3/36*     (2006.01)
(52) U.S. Cl. ............ 345/102; 345/82; 345/77; 345/690; 315/169.3; 349/61; 349/65; 362/97.1; 362/97.3
(58) Field of Classification Search ............... 345/76, 345/87, 102, 690; 315/169.3; 313/483, 486, 313/500, 505–507; 349/61, 62, 65; 362/97.1–97.3
See application file for complete search history.

(56) References Cited

U.S. PATENT DOCUMENTS

| | | | |
|---|---|---|---|
| 2005/0135097 A1 | 6/2005 | Kawabata et al. | |
| 2006/0007369 A1* | 1/2006 | Jin et al. | 349/58 |
| 2007/0052662 A1* | 3/2007 | Kim et al. | 345/102 |
| 2009/0262066 A1* | 10/2009 | Oke et al. | 345/102 |
| 2010/0060818 A1 | 3/2010 | Ajichi et al. | |
| 2010/0188324 A1* | 7/2010 | Ohashi et al. | 345/102 |
| 2010/0259566 A1* | 10/2010 | Watanabe | 345/690 |
| 2011/0025594 A1* | 2/2011 | Watanabe | 345/102 |
| 2011/0102302 A1* | 5/2011 | Watanabe et al. | 345/4 |

FOREIGN PATENT DOCUMENTS

| | | |
|---|---|---|
| EP | 1 843 319 A2 | 10/2007 |
| JP | 2007-141715 A | 6/2007 |
| JP | 2008-181749 A | 8/2008 |
| JP | 2010-78690 A | 4/2010 |
| KR | 20-0394888 Y1 | 9/2005 |
| KR | 10-2007-0077272 A | 7/2007 |
| KR | 10-2007-0097902 A | 10/2007 |
| KR | 10-2009-0071488 A | 7/2009 |
| WO | WO 2009/098809 A1 | 8/2009 |
| WO | WO 2009122691 A1 * | 10/2009 |
| WO | WO 2009157161 A1 * | 12/2009 |

* cited by examiner

*Primary Examiner* — Lun-Yi Lao
*Assistant Examiner* — Priyank Shah
(74) *Attorney, Agent, or Firm* — Birch, Stewart, Kolasch & Birch, LLP

(57) ABSTRACT

The embodiments provide a backlight unit including a bottom cover, a plurality of light emitting device assembly each having a light emitting device module including at least one light emitting device, the light emitting device assembly arranged on the bottom cover adjacent to one another, a power supply unit for supplying power to the light emitting device module in each of the light emitting device assembly, and a control unit for controlling the power supply unit such that, of the light emitting device modules of the light emitting device assembly, intensity of current supplied to a light emission device positioned at an edge region of each of the light emitting device assembly is different from the intensity of current supplied to the light emission device positioned at a middle region of each of the light emitting device assembly.

18 Claims, 8 Drawing Sheets

BACKLIGHT UNIT AND DISPLAY DEVICE

CROSS REFERENCE TO RELATED APPLICATION

This application claims the benefit of the Patent Korean Application No. 10-2010-0041816, filed on May 4, 2010, which is hereby incorporated by reference as if fully set forth herein.

BACKGROUND OF THE DISCLOSURE

1. Field of the Disclosure

The embodiments relate to a backlight unit, and more particularly to a backlight unit and a display device which can display uniform brightness throughout an entire screen.

2. Discussion of the Related Art

Since a liquid crystal display device, which is one of light receiving type flat display device used as computer monitors, or LCD-TV, and cellular phone terminals, has no spontaneous light emission capability, the liquid crystal display device has an external illumination light incident thereon selectively for producing a picture.

For this, the liquid crystal display device has the backlight unit mounted to a rear side of an inside thereof for emitting the light.

In the backlight unit, there are a direct light type and an edge light type depending on an arrangement of a light emitting device.

The direct light type is a type in which the light emitting device is mounted to a light guide plate provided to a rear side of a liquid crystal panel for directing the light to the rear side of the light guide plate, and the edge light type is a type in which the light emitting device is arranged on a side of the light guide plate for directing the light to the side of the light guide plate.

Since a related art backlight unit has one or a plurality of light emitting device arrays covered with one light guide plate, the related art backlight unit is required to replace an entire light guide plate if the light guide plate has a defect at a portion thereof.

Particularly, if the light guide plate has a scratch, stain, or deformation at a portion of a surface thereof, since brightness of the light at the portion of the screen of the display device matching to the surface is different from other portions distinctively, it has been required to replace the entire light guide plate for solving above problem.

In the meantime, in a case of a large sized display device, a size of the light guide plate can not but become larger in proportion to a size of the screen, requiring cumbersome and time consuming assembly work in fabrication of the backlight unit with such a large sized light guide plate.

SUMMARY OF THE DISCLOSURE

Accordingly, the embodiments are directed to a backlight unit and a display device.

An object of the embodiments are to provide a backlight unit and a display device in which a backlight unit having a plurality of light emitting device assembly are provided for making assembly and management of the light emitting device assembly easy, and which can control intensity of a current applied to a light emitting device module for making brightness of a light on a screen is uniform throughout the screen.

Additional advantages, objects, and features of the disclosure will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these objects and other advantages and in accordance with the purpose of the embodiments, as embodied and broadly described herein, a backlight unit includes a bottom cover, a plurality of light emitting device assembly each having a light emitting device module including at least one light emitting device, the light emitting device assembly arranged on the bottom cover adjacent to one another, a power supply unit for supplying power to the light emitting device module in each of the light emitting device assembly, and a control unit for controlling the power supply unit such that, of the light emitting device modules of the light emitting device assembly, intensity of current supplied to a light emission device positioned at an edge region of each of the light emitting device assembly is different from the intensity of current supplied to the light emission device positioned at a middle region of each of the light emitting device assembly.

In this instance, the control unit can control the intensity of the current applied to the light emission device positioned at the edge region of each of the light emitting device assembly to be greater than the intensity of the current applied to the light emission device positioned at the middle region of each of the light emitting device assembly.

And, the light emitting device assembly can include a light guide plate arranged over the light emitting device module.

And, the light guide plate can include a light incident portion for receiving the light from the light emitting device module, and a light forwarding portion for forwarding the light received thus through the light incident portion to a direction different from a direction of light incidence.

And, the light emitting device module can be arranged on a lower side in a lateral direction thereof.

And, the control unit can control intensity of the current led to the light emitting device module such that quantities of the light incident on the light guide plate is the greatest at both ends of the light guide plate.

And, the light emitting device module can include a plurality of light emitting devices and a circuit board having the light emitting devices arranged thereon, wherein a predetermined number of the light emitting devices can be grouped as a light emission unit such that a plurality of the light emission units form the light emitting device module, and the control unit leads the current to the light emission units independent from one another.

And, the control unit can control such that intensity of the current led to outermost light emission units positioned at both ends of the light emitting device module is greater than the intensity of the current led to the light emission units arranged between the outermost light emission units.

And, the control unit can control such that, of the light emission units in the light emitting device modules of the plurality of the light emitting device assembly mounted on the bottom cover, the intensity of the current led to the light emission units the most adjacent to edges of the bottom cover is the greatest of intensity of current led to all of the light emission units.

And, the light emitting device assembly can be arranged in a matrix having a plurality of columns and a plurality of rows.

And, the control unit can control such that, of the light emission units in the light emitting device module of each of the plurality of light emitting device assembly, the intensity of the current led to the light emission units in the light emitting device modules of the light emitting device assembly arranged at the outermost sides is greatest.

And, the control unit can control such that, of the light emission units in the light emitting device module of each of the plurality of light emitting device assembly, the intensity of the current led to the light emission units in the light emitting device modules of the light emitting device assembly arranged at a lowest edge is greatest.

In another aspect of the embodiments, a display device includes a bottom cover, a plurality of light emitting device assembly each having a light emitting device module including at least one light emitting device, the light emitting device assembly arranged on the bottom cover adjacent to one another, an optical sheet for diffusing a light from the light emitting device assembly, a display panel provided in front of the optical sheet for producing an image, a power supply unit for supplying power to the light emitting device module in each of the light emitting device assembly, and a control unit for controlling the power supply unit such that, of the light emitting device modules of the light emitting device assembly, intensity of current supplied to a light emission device positioned at an edge region of each of the light emitting device assembly is different from the intensity of current supplied to the light emission device positioned at a middle region of each of the light emitting device assembly.

It is to be understood that both the foregoing general description and the following detailed description of the embodiments are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Figure 1:
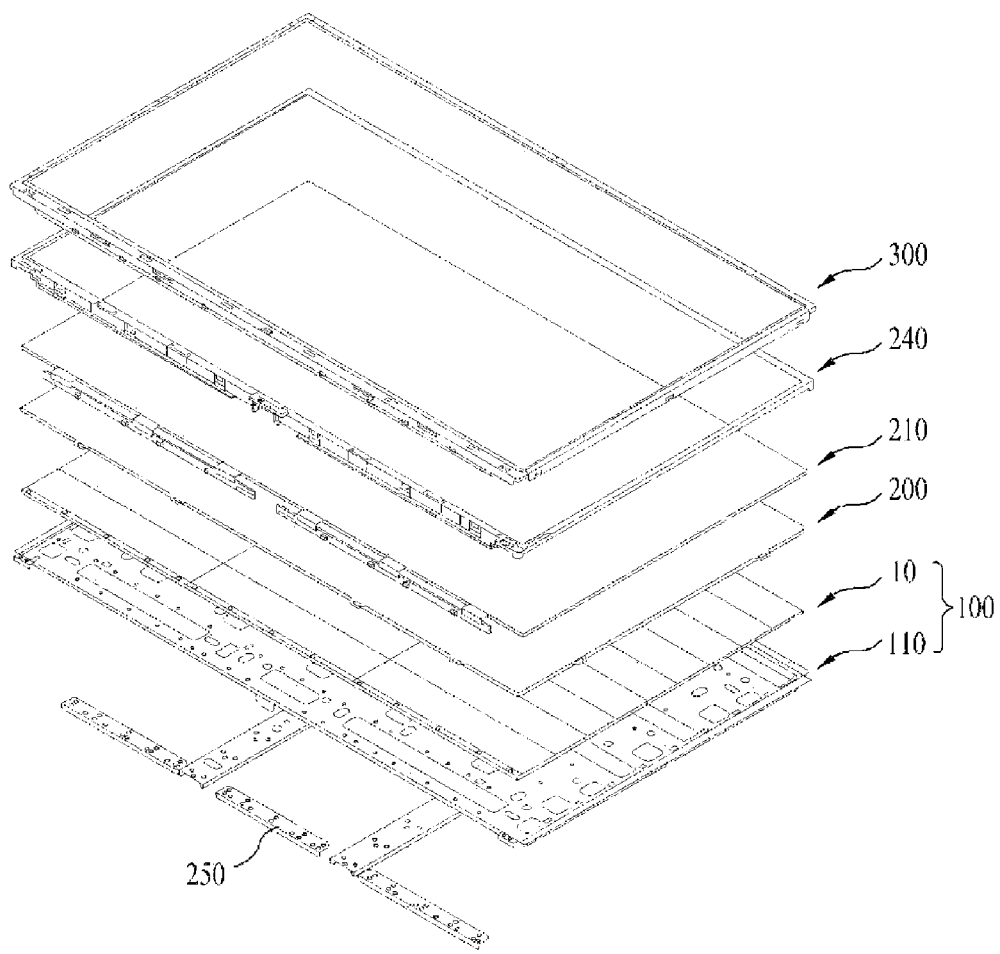
FIG. 1 illustrates an exploded perspective view of a display device having a backlight unit in accordance with a preferred embodiment.

Reference will now be made in detail to the specific embodiments, examples of which are illustrated in the accompanying drawings. Wherever possible, the same reference numbers will be used throughout the drawings to refer to the same or like parts.

It is required to understand that, in a case of a description of above embodiments that a layer (a film), a region, a pattern, or a structure is formed "on" or "under" a substrate, a layer (a film) a region, a pad, or pattern, the "on", or "under" implies that the layer (the film), the region, the pattern, or the structure is formed directly or indirectly. And, reference on the "on" or "under" is the drawing.

A thickness or a size of a layer shown in a drawing is exaggerated, omitted or shown schematically for convenience or clarity of description. And, a size of an element is not shown to scale, perfectly.

Referring to FIG. 1, the display device of the embodiment includes a backlight unit 100, an optical sheet 200 in front of the backlight unit 100 for diffusing a light from the backlight unit 100, a display panel 210 in front of the optical sheet 200 for producing an image.

There is a fastening member 240 provided to edges of the backlight unit 100, the optical sheet 200, and the display panel 210 for holding and fastening the same together, and the fastening member 240 has a top cover 300 mounted thereto.

The backlight unit 100 includes a bottom cover 110, and a plurality of light emitting device assembly 10 disposed adjacent to one another inside of the bottom cover.

Provided in rear of the bottom cover 110, there is at least one beam member 250 arranged in a longitudinal or a transverse direction, for preventing the bottom cover 110 from deforming thermally or physically.

The beam member 250 can be a lengthy extension in one direction, and can be formed of a metal having heat expansion coefficient smaller than the bottom cover 110 and stiffness greater than the bottom cover 110.

In the meantime, on a rear side of the bottom cover 110, there can be a substrate (not shown) for a power supply unit (not shown) which can supply power to the display panel 210 and other driving circuits.

Figure 2:
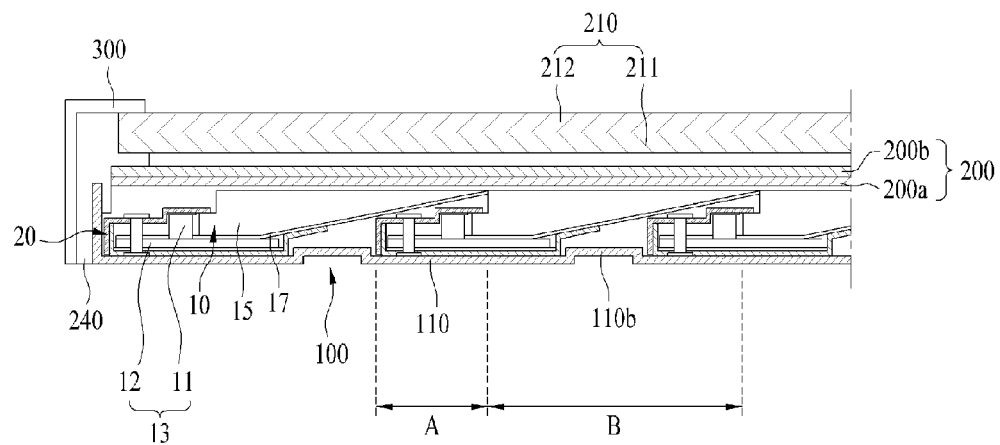
FIG. 2 illustrates a longitudinal section of a display device in accordance with a preferred embodiment.

Referring to FIG. 2, arranged on the bottom cover 110 of the backlight unit 100, there are a plurality of light emitting device assembly 10 arranged adjacent to one another.

Each of the light emitting device assembly 10 includes a light emitting device module 13, a light guide plate 15 arranged adjacent to the light emitting device module 13, a reflective sheet 17 arranged in rear of the light guide plate 15, and a fastening cover 20 for fastening the light emitting device module 13, the light guide plate 15, and the reflective sheet 17 together.

The light emitting device module 13 includes a light emitting device 11, and a circuit board 12 having the light emitting device arranged thereon. The light emitting device 11 is mounted to emit the light toward the light guide plate 15.

A portion of the light emitting device assembly 10 having the light emitting device module 13 arranged thereon can be defined as a light emission region A, and a region thereof for receiving the light from the light emitting device module 13 and forwarding the light through the light guide plate 15 can be defined as a light forwarding region B.

The light emitting device assembly 10 are arranged adjacent to one another along an inside surface of the bottom cover 110 such that a portion of the light guide plate 15 of one light emitting device assembly 10 can cover a portion of another light emitting device assembly 10 adjacent thereto.

This is a structure made available owing to an underside slope of the light guide plate 15, enabling a portion of the light forwarding region B of a particular light emitting device assembly 10 to cover the light forwarding region B of another light emitting device assembly 10.

The bottom cover 110 has a heat dissipation projection 110b projected inward thereof for increasing heat dissipation efficiency by increasing a surface area of the bottom cover 110.

And, the heat dissipation projection 110b is arranged between adjacent light emitting device assembly 10 for holding the light emitting device assembly 10.

In detail, since the underside of the light guide plate 15 has a slope, enabling to form a space between the light guide plate 15 and the reflective sheet 17 and the bottom cover 110, the heat dissipation projection 110b can be arranged in the space.

The heat dissipation projection 110b can serve as a spacer which guides a mounting position of the light emitting device assembly 10, and, in a case the display device or the backlight unit is arranged upright, the heat dissipation projection 110b can serve as a supporting portion which supports a lower side of the light emitting device assembly 10.

The optical sheet 200 over or on a front of the light guide plate 15 can have a diffusion sheet 200a, and/or a prism sheet 200b.

The diffusion sheet 200a diffuses the light from the light guide plate 15 uniformly, and the light diffused by the diffusion sheet 200a can be converged onto the display panel 210 by the prism sheet 200b.

The prism sheet 200b can have a horizontal or vertical prism sheet of one or more than one light intensity enhancing film, or the like.

Though not shown, in order to make the optical sheet 200 to maintain a secured state without shaking at the time the optical sheet 200 is arranged on the backlight unit, there can be a guide pin (not shown) provided on the bottom cover 100 for holding the optical sheet 200.

For coupling to the guide pin (not shown), the optical sheet 200 can have a predetermined hole or recess for securing the optical sheet 200 to the bottom cover 100 as the guide pin (not shown) is coupled to the hole or recess.

The display panel 210 is provided on or over the front of the optical sheet 200.

The display panel 210 has a lower substrate 211 and an upper substrate 212 bonded together to face each other while maintaining a uniform cell gap, and a liquid crystal layer disposed between the two substrates 211 and 212.

Formed on the lower substrate 211, there are a plurality of gate lines and a plurality of data lines formed perpendicular to the gate lines. There can be a thin film transistor TFT formed at every crossed region of the gate lines and the data lines.

In the meantime, provided on the upper substrate, there can be RGB color filters. However, the color filters are provided not only on the upper substrate 212.

Besides the thin film transistors, the lower substrate 211 can include the color filters.

A configuration of the display panel 210 of the upper substrate 211 and the lower substrate 212 is not limited to above, but the configuration can vary with liquid crystal layer driving systems.

Provided at an edge of the display panel 210, there can be a gate driving PCB (Printed Circuit Board) for supplying a scan signal to the gate line. And, the display panel 210 can have a polarization film (not shown) arranged at least one of the upper surface (or a front surface) or a lower surface (rear surface) of the display panel 210.

Edges of the display panel 210, the optical sheet 200, and the backlight unit 100 are surrounded and fastened by the fastening member 240, and the fastening member 240 is surrounded and fastened by the top cover 300.

Figure 3:
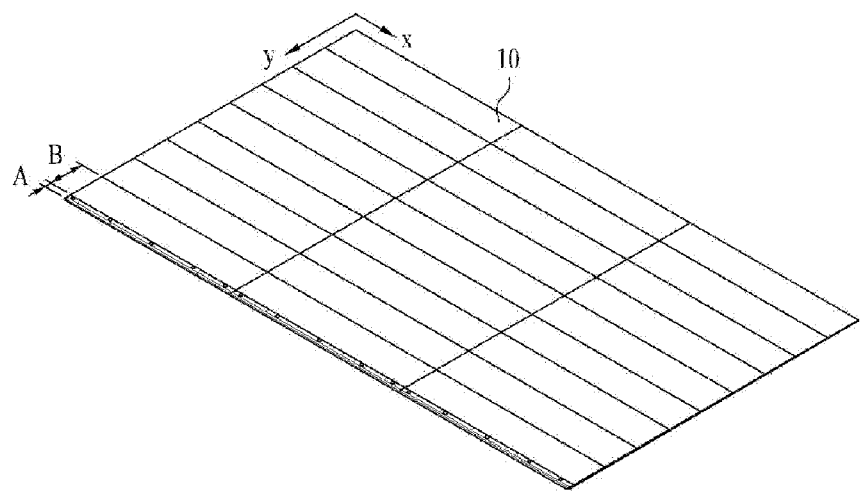
FIG. 3 illustrates a perspective view showing a plurality of light emitting device assembly mounted to a backlight unit in accordance with a preferred embodiment.

Referring to FIG. 3, there are a matrix of light emitting device assembly 10 arranged in x-, and y-axes. For an example, twenty seven light emitting device assembly 10 can be arranged in a 3×9 matrix.

As described before, each of the light emitting device assembly 10 has the light emission region A for emission of the light and the light forwarding region B for forwarding the light, wherein the light emission region A of the light emitting device assembly 10 can be covered with the light forwarding region B of a lower side light emitting device assembly 10 except lowest light emitting device assembly 10.

This structure prevents the light emission regions A of the light emitting device assembly 10 from exposing to an outside except the lowest light emitting device assembly 10.

Figure 4:
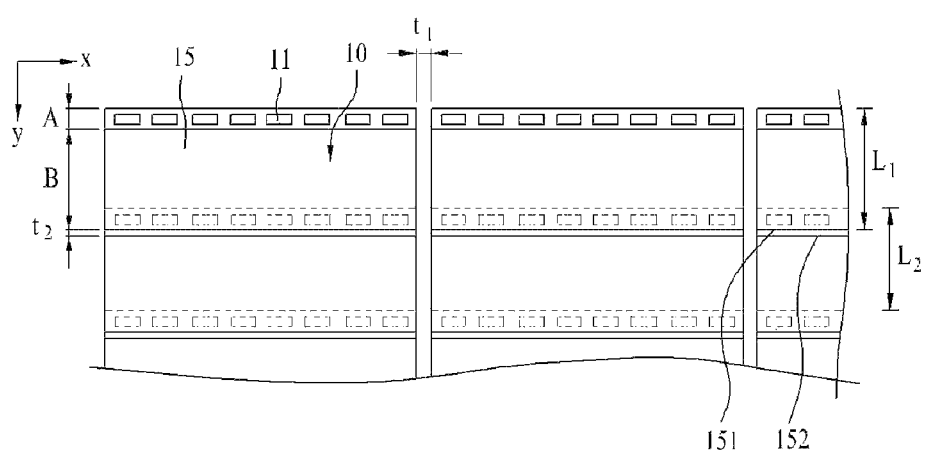
FIG. 4 illustrates a plan view showing an arrangement of the plurality of light emitting device assembly in FIG. 3.

Referring to FIG. 4, if portions of the light emitting device assembly 10 are overlapped respectively, the light guide plates 15 of the light emitting device assembly 10 can be arranged spaced from one another in up/down, and left/right directions for certain extents, respectively.

In this instance, an x direction, being the left/right direction, is a direction in which the light emitting device assembly 10 are spaced from one another without being overlapped with one another, and a y direction, being up/down direction, is a direction in which light emitting device assembly 10 overlap with one another for some extents.

It is defined that an upper/lower region of a particular light emitting device assembly 10 is L1 and an upper/lower region of another light emitting device assembly 10 a portion of which overlaps with the upper/lower region L1 is L2.

An edge 151 of the light guide plate 15 of the light emitting device assembly 10 having the L1 upper/lower region is spaced by a distance t2 from a stepped portion 152 of the light guide plate 15 of the light emitting device assembly 10 having the L2 upper/lower region.

Distances like t1 and t2 are set thus to take thermal expansion of the light guide plate 15 of resin by heat from the light emitting device module 13 into account.

The distances enable to prevent a particular light guide plate from being brought into contact with an adjacent light guide plate to result in deformation or breakage thereof.

Particularly, if the light emitting device includes the light emission diode LED, and the light guide plate 15 is formed of a resin having great thermal expansion coefficient, the light guide plate 15 is liable to undergo thermal expansion by the heat from the light emission diode.

In view of such a nature, if the light guide plates are arranged to abut before thermal expansion, the light guide plates will apply a pressure to each other if the light guide plates are expanded thermally, resulting in breakage or thermal deformation of the light guide plates.

Moreover, an arrangement of the light emitting device assembly 10 including the light guide plates 15 is liable to distort.

However, as described before, since adjacent light guide plates 15 are spaced by the distance from each other without being in contact with each other, problems caused by deformation due to the thermal expansion and a defective arrangement can be solved.

As described with reference to FIG. 2, since the light emitting devices 11 of the light emitting device assembly 10 of the embodiments are arranged under the light guide plates 15, the light emitting devices 11 emit the light in a fashion of the edge type backlight unit.

And, since the light emitting device assembly 10 are arranged adjacent to one another, and each one of the light emitting device assembly 10 functions as one light emitting device, the light emitting device assembly 10 has a characteristic of the direct type backlight unit.

However, in this case, though a general direct light type backlight unit has a characteristic of a point light emitting device, the light emitting device assembly 10 of the embodiment can have a characteristic of a surface light emitting device.

Therefore, the light emitting device assembly 10 can solve a problem in which the light emitting device is displayed as a hot spot on the screen, and has a thickness reduced from the related art direct light type backlight unit, too.

Figure 5:
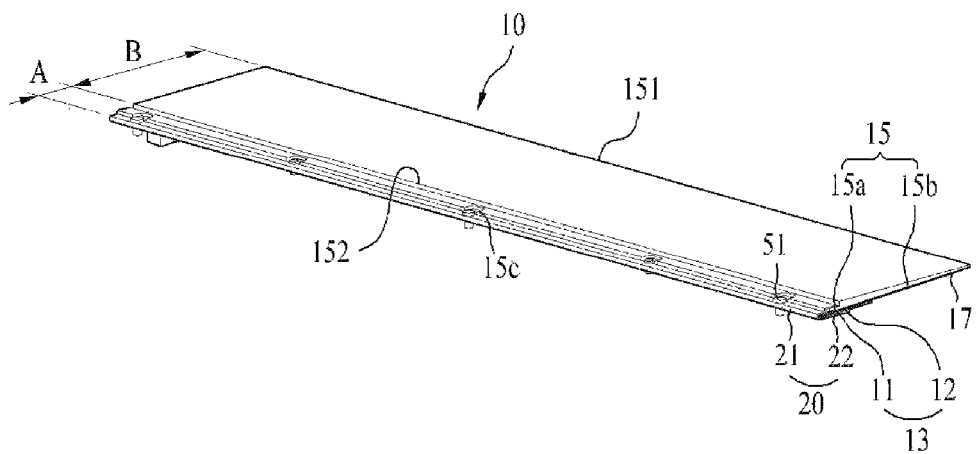
FIGS. 5 and 6 illustrate front perspective views of light emitting device assembly in accordance with a preferred embodiment, respectively.

Referring to FIG. 5, the light emitting device assembly 10 is divided into the light emission region A and the light forwarding region B.

The light emission region A includes the light emitting device module 13 having the light emitting device 11 and the circuit board 12, and a light incident portion 15a which is a portion of the light guide plate 15 arranged adjacent to the light emitting device 11 for receiving the light.

And, the light emitting device module 13 and the light incident portion 15a of the light guide plate 15 are surrounded and coupled together by the fastening cover 20.

The fastening cover 20 serves to cover a front and a rear of the light emission region A, wherein the front is surrounded by the first fastening cover 21 and the rear is surrounded by the second fastening cover 22.

The light forwarding region B has a light forwarding portion B which is a portion of the light guide plate 15 and the reflective sheet 17 on a rear side of the light forwarding portion B.

The light forwarding portion 15b is connected to the light incident portion 15a and extended to one side.

In the meantime, there is a stepped portion 152 provided at a boundary of the light forwarding portion 15b and the light incident portion 15a. The light forwarding portion 15b has an edge 151 which is formed the thinnest of the light guide plate 15.

Figure 6:
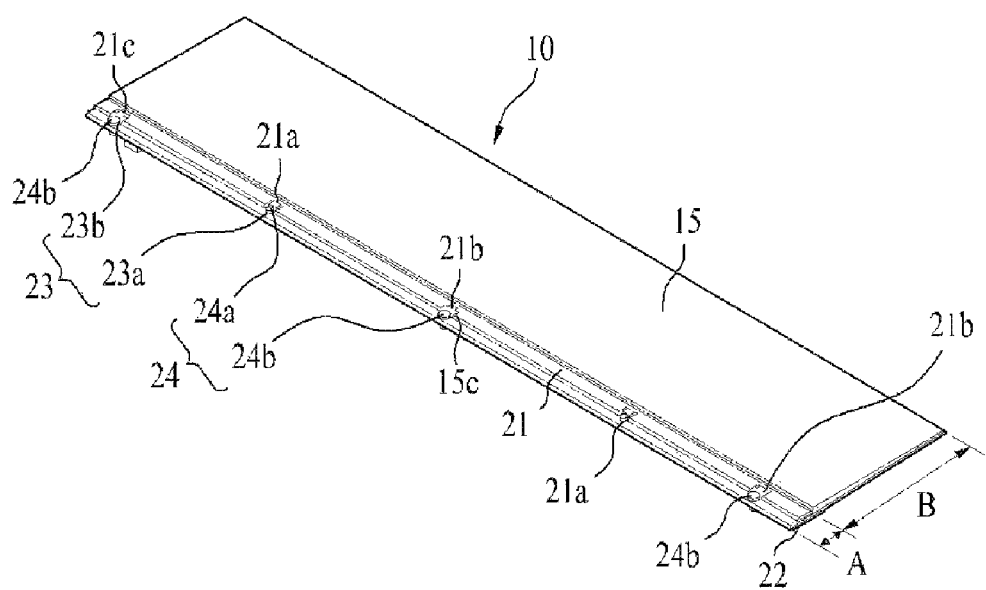

Referring to FIG. 6, the first fastening cover 21 has fastening holes 21a, 21b and 21c for placing a portion of the light guide plate 15 therein and fastening the same thereto.

Once the fastening holes 21a, 21b and 21c are coupled to portions of the light guide plate 15 respectively, positioning between the light guide plate 15 and the first fastening cover 21 can be made.

In the meantime, provided on sides of the fastening holes 21a, 21b and 21c, there are predetermined inserting holes 23; 23a and 23b in which screw shaped fastening members 24; 24a and 25b are inserted.

In this instance, of the inserting holes 23; 23a and 23b in the first fastening cover 21, the inserting holes 23b in middle and both ends are provided for the light emitting device assembly 10 to be fastened to the bottom cover 110 (See FIG. 1) with fastening members 24b.

And, the small inserting holes 23a on both sides of the middle inserting hole 23b is provided for the light guide plate 15 and the light emitting device module 13 to be fastened with the fastening members 24a.

Figure 7:
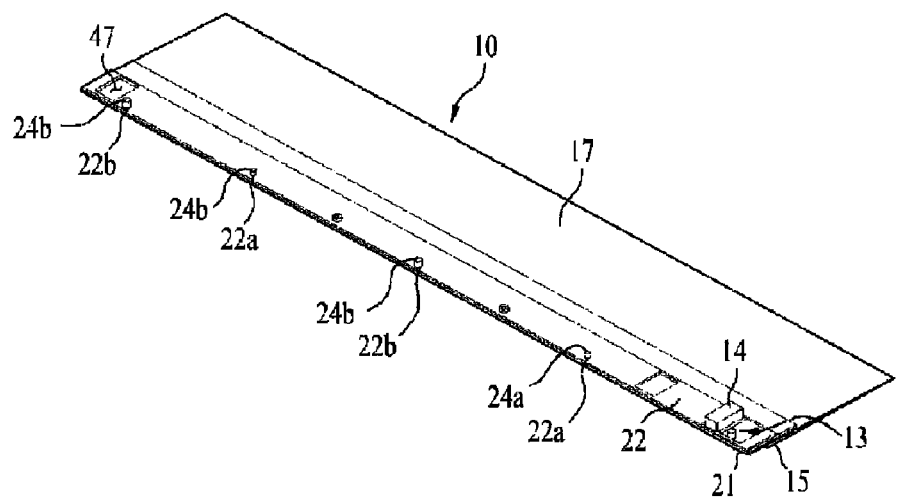
FIG. 7 illustrates a rear perspective view of a light emitting device assembly in accordance with a preferred embodiment.

Referring to FIG. 7, shown on a rear side of the light emitting device assembly 10, there are the reflective sheet 17 for covering a rear side of the light guide plate 15 and the second fastening cover 22 on a lower side of the reflective sheet 17 for covering and fastening the reflective sheet 17 and the light guide plate 15.

The second fastening cover 22 has fastening holes 22a and 22b formed matched to the inserting holes 23a and 23b formed in the first fastening cover 21.

The fastening members 24; 24a and 24b pass through and fasten the inserting holes 23a and 23b and the fastening holes 22a and 22b respectively, and an edge of the relatively larger fastening member 24b has a great projection coupled to the bottom cover 110 (See FIG. 1).

And, the second fastening cover 22 has a connector hole 47 provided thereto for placing a connector 14 therein to connect to the light emitting device module 13 unit to couple to the bottom cover 110 (See FIG. 1).

The second fastening cover 22 can have a plurality of the connector holes 47 for taking a position change of the connector 14 with a coupling position of the light emitting device assembly to the bottom cover 110 into account.

Thus, the connector 14 is coupled to the power supply unit (not shown) provided to the bottom cover to enable power supply to the light emitting device module 13.

Figure 8:
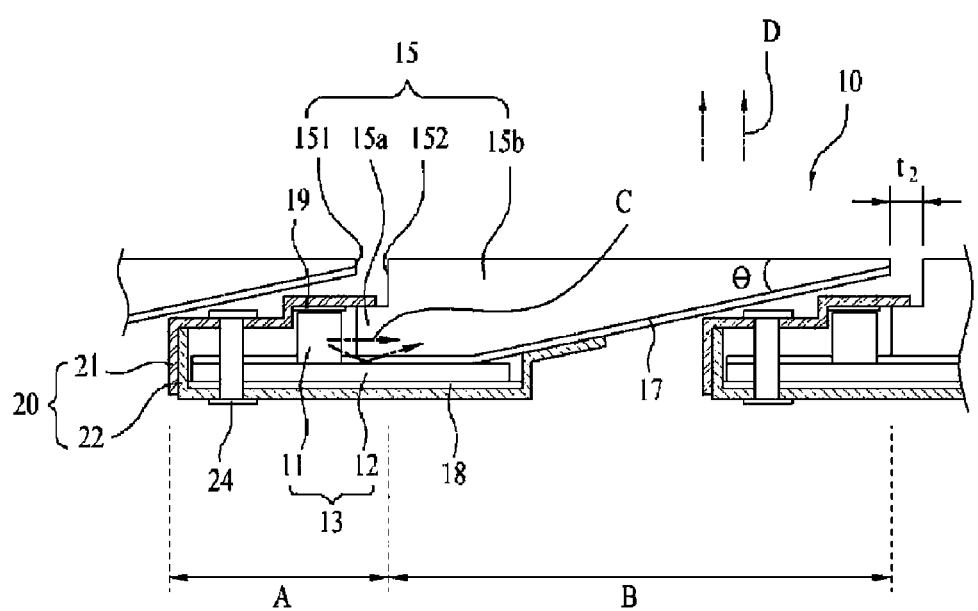
FIG. 8 illustrates a longitudinal section of a light emitting device assembly in accordance with a preferred embodiment.

Referring to FIG. 8, as described before, the light emitting device assembly 10 is divided into the light emission region A and the light forwarding region B, and, in general, the light emission region A has an LED type light emitting device 11, and the light emitting device module 13 having the circuit board 12.

The light incident portion 15a of the light guide plate 15 has a side provided to face the light emitting device 11 such that the light from the light emitting device 11 travels in a C direction to incident on the light incident portion 15a.

The light forwarding portion 15b is connected to the light incident portion 15a as one unit such that the light incident on the light incident portion 15a enters into the light guide plate 15, is reflected totally or irregularly, and is forwarded to an outside of the light forwarding portion 15b.

In this instance, though the light is forwarded throughout the light forwarding portion 15b, the light directed to a rear side (or lower side) of the light guide plate 15 is reflected at the reflective sheet 17 provided in rear of (or on an underside) of the light guide plate 15, re-enters into the light guide plate 15, and is forwarded in a D direction, mostly.

The reflective sheet 17 is arranged throughout a rear side (or an underside) of the light guide plate 15, with a portion thereof placed and fastened between the circuit board 12 and the light guide plate 15 of the light emitting device module 13.

Coupling among the light emitting device module 13, the light guide plate 15, and the reflective sheet 17 is maintained by the fastening cover 20, wherein the first fastening cover 21 is arranged in front (or an upper side) of the light emitting device assembly 10, and the second fastening cover 22 is arranged in rear (or a lower side) of the light emitting device assembly 10.

And, the fastening member 24 fastens the first and second fastening covers 21 and 22 and the circuit board 12 together.

Provided on an inside of the first fastening cover 21, there is a supplementary reflective sheet 19 for guiding a portion of the light from the light emitting device 11 toward the light incident portion 15a of the light guide plate 15.

Though most of the light from the light emitting device 11 is directed toward the light incident portion 15a directly, a portion thereof is directed toward the first fastening cover 21 as the portion of the light passes through a process of transmission.

In order to re-direct the portion of the light directed to the first fastening cover 21 to the light guide plate 15, the supplementary reflective sheet 19 is required.

The supplementary reflective sheet 19 serves for, not only reflecting the light, but also preventing a current from flowing from the light emitting device 13 to the first fastening cover 21 as an electrode of the light emitting device 13 is in contact with the first fastening cover 21.

For this, the supplementary reflective sheet 19 can be formed of an insulating material and has a same or slightly greater size than that of the light emitting device 13.

The light emitting device 11 emits the light toward the light incident portion 15a of the light guide plate 15, making most of the light from the light emitting device 11 to be directed to the light incident portion 15a.

However, in view of a nature of the light, since the light radiates in all directions soon after the light emits from then light emitting device 11, a portion of the light is directed to the first fastening cover 21, causing a light loss.

Therefore, in order to prevent the light from losing, the supplementary reflective sheet 19 is arranged inside of the first fastening cover 21 close to the light emitting device 11. It is important to arrange the supplementary reflective sheet 19 close to the light emitting device 11.

And, since the light reflected thus is incident on the light incident portion 15a of the light guide plate 15, the light guide plate 15 can be arranged adjacent to the light incident portion.

The second fastening cover 22 is arranged close to the circuit board, wherein a heat dissipating member 18 is provided between the circuit board 12 and the second fastening cover 22 for transferring heat from the circuit board 12 to the second fastening cover 22.

Since the heat causes something wrong to the light emitting device 11 at the time of light emission if the heat remains at the circuit board 12, the heat dissipating member is mounted for transferring the heat from the light emitting device module 13 to an outside, quickly.

The heat dissipating member 18 can be formed of a material having high heat conductivity, such as metal, and graphite.

And, the heat dissipating member 18 can have a size the same with, or greater than a left/right direction width and an up/down direction width of the circuit board 12.

The light forwarding portion 15b of the light guide plate 15 is formed to have the underside with a slope of a predetermined angle θ such that the light forwarding portion 15b becomes the thinner as the light forwarding portion 15b goes toward an edge 151 thereof the more.

And, the edge 151 is placed to cover the light emitting region A of the light guide cartridge adjacent thereto. In this instance, though the slope angle θ can vary with situations, the angle is an optimum angle at which the light incident on the light incident portion 15a is scattered and reflected at the underside of the light forwarding region B and forwarded through the upper surface thereof the most efficiently.

And, in order to make the light forwarding efficiency greater, formation of a scattering pattern or a prism pattern on a surface of the light guide plate 15 can also be taken into consideration.

An edge of the reflective sheet 17 arranged along the sloped surface of the light guide plate 15 can be aligned with the stepped portion 152 of the light guide plate 15, or, as shown in FIG. 8, arranged beyond the stepped portion 152 so as to be in contact with an adjacent light guide plate.

It is required that adjacent light guide plates 15 are spaced from each other due to thermal expansion. In order to reflect the light from the light guide plate 15 to forward (or upward) of the light guide plate 15 by covering the space with the reflective sheet 17, the edge of the reflective sheet 17 can be arranged beyond the stepped portion 152 of the light guide plate 15.

Accordingly, it is made possible to prevent a dark line from becoming visible on the screen, and to minimize the light loss.

Thus, by an arrangement of the light emitting device assembly 10, the upper surface (or a front surface) of the light guide plate 15 can form a flat surface together with the upper surface (or a front surface) of an adjacent light guide plate, and by forming such a flat surface, the light emitting device assembly 10 can perform an efficient function as a surface light emitting device.

Figure 9:
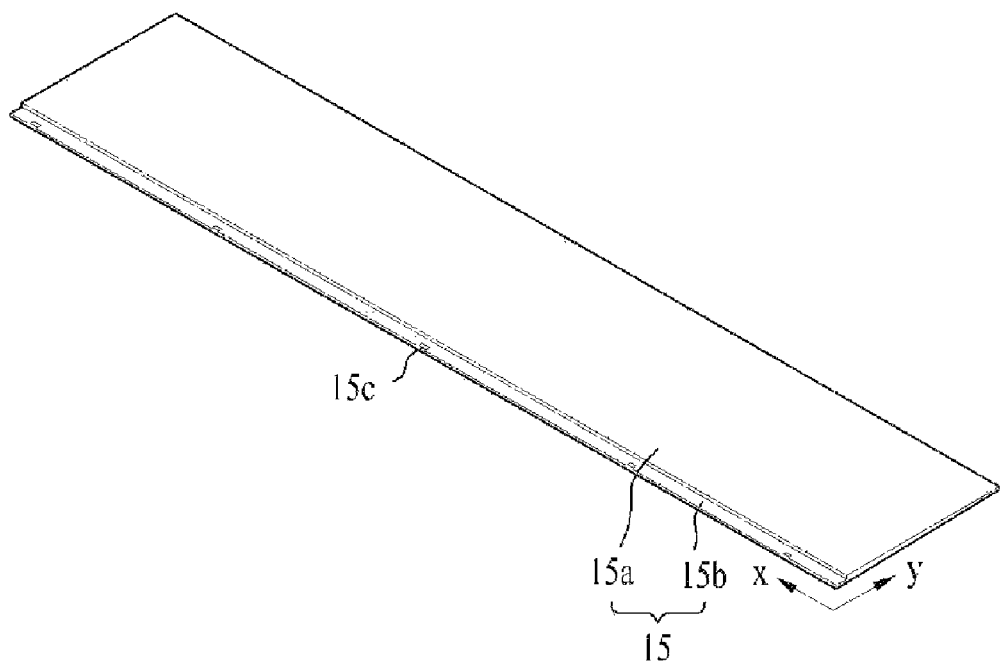
FIG. 9 illustrates a perspective of a light guide plate in accordance with a preferred embodiment.

Referring to FIG. 9, the light guide plate 15 has projections 15c from a lower portion. In detail, the projections 15c are formed on a surface of the light incident portion 15a.

The projections 15c formed thus are placed in the fastening holes 21a, 21b and 21c (See FIG. 6) for the light guide plate 15 to be fastened to the first fastening cover 21 without shaking.

The projection 15c can have a variety of shapes (cylindrical, square column and so on), and it is preferable that the projections 15c are arranged along the light incident portion 15a in a lateral direction at regular intervals.

Figure 10:
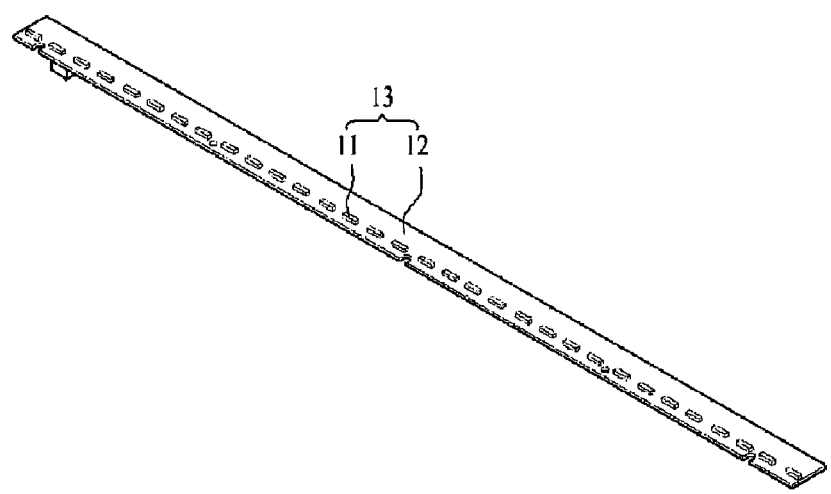
FIG. 10 illustrates a front perspective view of a light emitting device module in accordance with a preferred embodiment.

FIG. 10 illustrates the light emitting device module 13 including the circuit board 12 extended in a lateral direction, and a plurality of the light emitting devices 11 arranged on a surface of the circuit board 12 at regular intervals. The light emitting device module 13 can be arranged in the lateral direction on a lower side of the light guide plate.

Though the circuit board 12 can be any one selected from a general PCB, a metal core PCB, and a flexible PCB, the circuit board 12 is not limited to above.

As described before, the light emitting device 11 has LEDs, and particularly, the light emitting device 11 has a group of 3~4 LEDs as one unit and is driven independent from other units as power is supplied thereto, independently.

Owing to this, by performing an operation such as local dimming, the light emitting device 11 can produce brightness effectively better than at the time of operation of a display device.

In the embodiment, the backlight unit has thirty-two LEDs with four of them to form one unit, and 8 units thereof form one light emitting device module 32. However, a number of the LEDs are not limited to this, but a variety numbers can be applicable.

Figure 11:
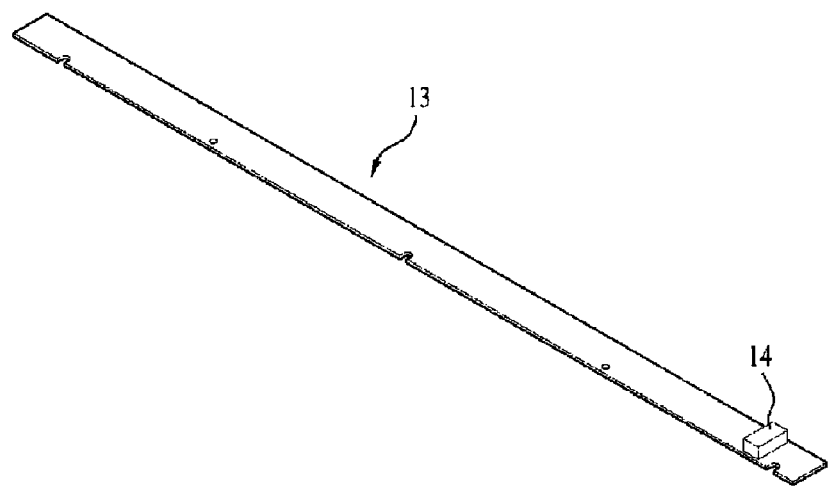
FIG. 11 illustrates a rear perspective view of a light emitting device module in accordance with a preferred embodiment.

Referring to FIG. 11, the circuit board 12 has the connector 14 on a rear surface for connection to the power supply unit (not shown) at the bottom cover 110 (See FIG. 1).

Figure 12:
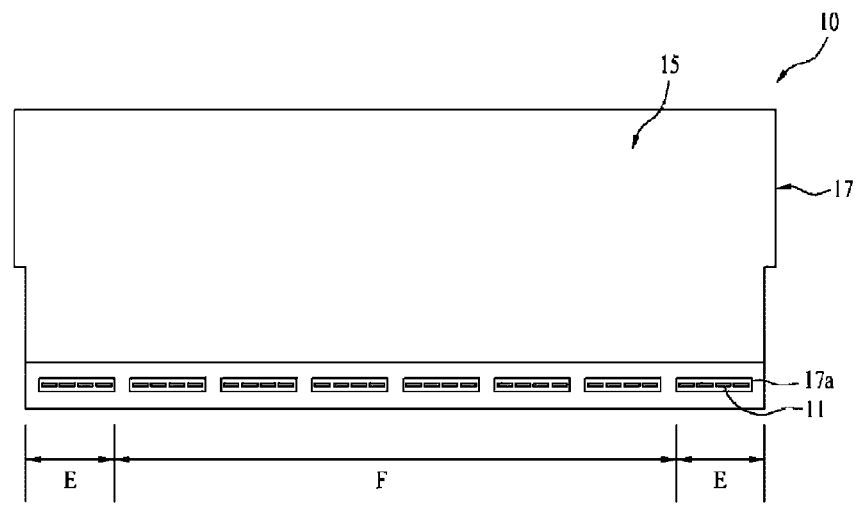
FIG. 12 illustrates a front perspective view of a light emitting device module in accordance with a preferred embodiment mounted to a reflective sheet.
Figure 13:
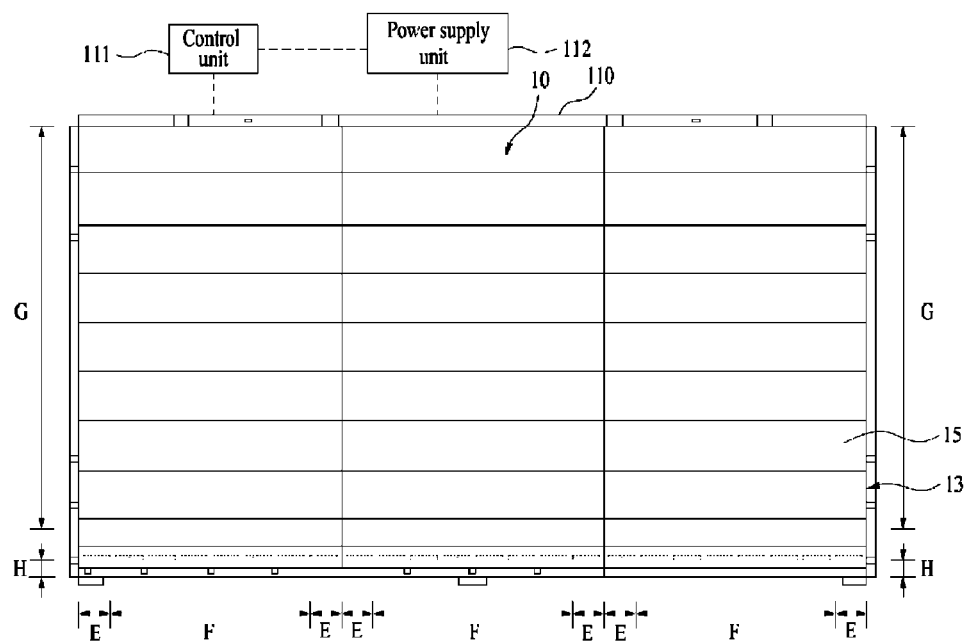
FIG. 13 illustrates a front view showing a matrix of light emitting device assembly arranged on a bottom cover in accordance with a preferred embodiment.

Referring to FIG. 12, the light emitting device 11 of the light emitting device module 13 is inserted and mounted in the inserting recess 17a in the reflective sheet 17. The plurality of the light emitting devices 11 provided to the light emitting device module 13 are divided into a few light emission units to which a current is led independently. In this instance, a control unit 111 can lead the current to each of the light emission units, independently.

In detail, the control unit 111 controls such that the current led to outermost light emission units at both ends of the light emitting device module 13 is more intense than the current led to the light emission units arranged between the outermost light emission units. And, of the light emission units of the light emitting device modules 13 provided to the plurality of the light emitting device assembly 10 mounted to the bottom cover 100, the control unit 111 can control such that intensity of the current led to the light emission units the most adjacent to the edge of the bottom cover is the greatest of all of the intensity of the currents led to all of the light emission units.

Though the embodiment suggests thirty-two light emitting devices, four of the light emitting devices form one light emission unit for emit the light as the current is led to each of the light emission units. That is, the embodiment suggests eight light emission units, and a light emission quantity can vary with the current led to the light emission units.

In a case the same current is led to all of the light emission units in the light emitting device assembly 10, the light emission quantities of a middle section and in the vicinity of the middle section of the light emitting device assembly 10 (an F section) are greater than the other section (E section).

This is because, in a case of the F section, though constructive interference takes place between the light from the light emitting device module arranged at the F section and the light from the light emitting device module at a side thereof to expect increased brightness, such increased brightness caused by such constructive interference can not be expected from the E section.

Hereafter, the F section is defined as a constructive section, and the E section is defined as a non-constructive section.

Accordingly, the intensity of the current led to the non-constructive section E, more specifically, the light emitting device modules provided to the outermost sections at both ends of each of the light emitting device assembly 10 is made greater than intensity of the current led to the light emitting device modules in the middle section and in the vicinity of the middle section of the light emitting device assembly 10, for supplementing the brightness increased effect caused by the constructive interference.

In this instance, though it is determined appropriate that a ratio of the intensity of the current of the light emission units arranged in the non-constructive section to the intensity of the current of the light emission units arranged in the constructive section is in a range of 2.5:1~3:1, this can vary with situations.

Therefore, if it is assumed that the current led to the light emission units in the constructive section is 10 mA, the current led to the light emission units in the non-constructive section can be determined to be in a range of 25~35 mA.

If the bottom cover 110 has the matrix of the light emitting device assembly 10 arranged thereon, the non-constructive section E and the constructive section F of the light emitting device assembly 10 can take place at every row.

Particularly, the non-constructive section E takes place at the light emission units adjacent to the edge of the bottom cover 10 and the light emission units arranged adjacent to the boundary line between adjacent light emitting device assembly 10 arranged side by side, respectively.

And, the constructive section F takes place at the light emission units arranged in the middle region and in the vicinity of the middle region of each of the light emitting device assembly 10.

Therefore, the control unit 111 provided to the embodiments can control the power supply unit 112 which supplies power to each of the light emitting device assembly 10 such that intensity of the current led to the constructive section E and the non-constructive section F is different from each other.

Particularly, of the light emission units arranged on the same row, the greatest intensity of the current can be supplied to the light emission units arranged closest to the edge of the bottom cover 110.

In detail, of the light emitting device modules 13 of each of the light emitting device assembly 10, the control unit 111 controls the power supply unit such that intensity of the current supplied to the light emission device 11 positioned at an edge region of each of the light emitting device assembly 10 is different from the light emission device 11 positioned at the middle region of each of the light emitting device assembly 10.

And, the control unit 111 can control such that the intensity of the current applied to the light emission device positioned at the edge region of each of the light emitting device assembly 10 is greater than intensity of the current supplied to the light emission device 11 positioned at the middle region of each of the light emitting device assembly 10. Particularly, the control unit 111 can control the intensity of the current led to the light emitting device module such that a quantity of the light incident on the light guide plate is greatest at both ends of the light guide plate.

In the meantime, in the matrix of the light emitting device assembly 10, the constructive section G and the non-constructive section H take place in up/down directions.

That is, if the current is led to all of the light emitting device assembly 10, the light from the light emitting device module 13 travels upward toward the light guide plate 15 like the edge type backlight unit, and travels to a front direction after scattering and reflecting within the light guide plate 15.

In this process, the light from all of the light emitting device assembly 10 except a lowest edge light emitting device assembly 10 cause constructive interference with the light from underlying light emitting device assembly.

According to this, the up/down direction constructive region G is formed.

However, since the light from the lowest edge light emitting device assembly 10 have no object to cause the constructive interference, if the same current is led to the light emitting device assembly 10 arranged at each column, a portion of the screen matching to the lowest edge light emitting device assembly 10 will appear dark, relatively.

As a result of this, the up/down direction non-constructive section H takes place.

Therefore, in order to overcome such a difference of brightness, the intensity of the current led to the light emitting device module 10 positioned at the lowest edge of the matrix can be made greater than the intensity of the current led to the other light emitting device modules.

That is, in summary, of the light emission units in the light emitting device assembly on the same row, it is required that the current with the greatest intensity is led to the outermost light emission units, and, of the light emission units in the light emitting device assembly on the same column, it is required that the current with the greatest intensity is led to the lowest light emission units.

Eventually, of the matrix of the light emitting device assembly, places to which the greatest intensity of the current are to be led will be the light emission units at left and right ends of the lowest edge of four corners of the matrix.

As has been described, the backlight unit and the display device of the embodiments have the following advantages.

Since the backlight unit and the display device can assemble the plurality of light emitting device assembly independently, management of the backlight unit becomes easier.

Since leading the current to each of the light emitting device assembly can be made independently, and leading the current to the light emitting devices in each of the light emitting device assembly can be made independently, local image brightness control, such as local dimming, can be made available.

And, by supplying the current to the light emitting devices at parts extents of the constructive interference with the light from the other light emitting device is weak like the lowest edge additionally, the brightness can be made uniform throughout an entire screen.

In the meantime, since a light emission quantity at the boundary line between adjacent light emitting device assembly is smaller than the light emission quantity in the middle of the light emitting device assembly, causing the boundary line to appear relatively dark to show a dark line, the problem of dark line can be solved by leading the current having intensity greater than the current to the other light emitting device to the light emitting device adjacent to the portion at which the dark line can take place.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
a bottom cover;
a plurality of light emitting device assemblies,
wherein each of the light emitting device assemblies has a light emitting device module,
wherein the light emitting device assemblies are arranged in a matrix having a plurality of columns and a plurality of rows on the bottom cover and are adjacent to one another, and
wherein a predetermined number of light emitting diodes are grouped as a light emission unit such that at least two light emission units form the light emitting device module;
a power supply unit configured to supply power to the light emitting device module; and
a control unit configured to control the power supply unit, such that, in the light emitting device assembly, intensity of current supplied to a light emission diode positioned at an edge region of the light emitting device assembly is different from intensity of current supplied to a light emission diode positioned at a middle region of the light emitting device assembly, and
such that in the plurality of the light emitting device assemblies, an intensity of current to the light emission units in the light emitting device module of at least one light emitting device assembly arranged at an outermost column and at a lowest row is greater than an intensity of current to any of the other light emission units.

2. The backlight unit as claimed in claim 1, wherein the control unit controls the intensity of the current applied to the light emission diode positioned at the edge region of the light emitting device assembly to be greater than the intensity of the current applied to the light emission device positioned at the middle region of the light emitting device assembly.

3. The backlight unit as claimed in claim 1, wherein the light emitting device assembly further includes a light guide plate arranged over the light emitting device module.

4. The backlight unit as claimed in claim 3, wherein the light guide plate includes:

a light incident portion configured to receive the light from the light emitting device module; and
a light forwarding portion for forwarding the light received from the light incident portion to a direction different from a direction of light incidence.

5. The backlight unit as claimed in claim 3, wherein the light emitting device module is arranged on a lower side in a lateral direction of the light guide plate.

6. The backlight unit as claimed in claim 3, wherein the control unit controls intensity of the current led to the light emitting device module such that quantities of the light incident on the light guide plate are the greatest at both ends of the light guide plate.

7. The backlight unit as claimed in claim 1, wherein the light emitting device module further includes a circuit board having the light emitting diode arranged thereon, and
wherein the control unit leads the current to the light emission units independently from one another.

8. The backlight unit as claimed in claim 7, wherein the control unit controls such that intensity of the current led to outermost light emission units positioned at both ends of the light emitting device module is greater than the intensity of the current led to the light emission units arranged between the outermost light emission units.

9. The backlight unit as claimed in claim 1, wherein a ratio of the intensity of the current applied to the light emission device positioned at the edge region of the light emitting device assembly to the intensity of the current applied to the light emission device positioned at the middle region of the light emitting device assembly is 2.5~3:1.

10. A display device comprising:
a bottom cover;
a plurality of light emitting device assemblies,
wherein each of the light emitting device assemblies has a light emitting device module,
wherein the light emitting device assemblies are arranged in a matrix having a plurality of columns and a plurality of rows on the bottom cover and are adjacent to one another, and
wherein a predetermined number of light emitting diodes are grouped as a light emission unit such that at least two light emission units form the light emitting device module;
at least one optical sheet for diffusing a light from the light emitting device assembly;
a display panel provided in front of the optical sheet for producing an image;
a power supply unit for supplying power to the light emitting device module; and
a control unit for controlling the power supply unit,
such that, in the light emitting device assembly, intensity of current supplied to a light emission diode positioned at an edge region of emitting device assembly is different from intensity of current supplied to a light emission diode positioned at a middle region of the light emitting device assembly, and
such that, in the plurality of the light emitting device assemblies, an intensity of current to the light emission units in the light emitting device module of at least one light emitting device assembly arranged at an outermost column and at a lowest row is greater than an intensity of current to any of the other light emission units.

11. The display device as claimed in claim 10, wherein the control unit controls the intensity of the current applied to the light emission diode positioned at the edge region of the light emitting device assembly to be greater than the intensity of the current applied to the light emission diode positioned at the middle region of the light emitting device assembly.

12. The display device as claimed in claim 10, wherein the light emitting device assembly further includes a light guide plate arranged over the light emitting device module.

13. The display device as claimed in claim 12, wherein the light emitting device module is arranged on a lower side in a lateral direction of the light guide plate.

14. The display device as claimed in claim 12, wherein the light emitting device module further includes a circuit board having the light emitting diode arranged thereon, and
   wherein the control unit leads the current to the light emission units independent from one another.

15. The display device as claimed in claim 14, wherein the control unit controls such that intensity of the current led to outermost light emission units positioned at both ends of the light emitting device module is greater than the intensity of the current led to the light emission units arranged between the outermost light emission units.

16. The display device as claimed in claim 12, wherein the light guide plate includes:
   a light incident portion for receiving the light from the light emitting device module; and
   a light forwarding portion for forwarding the light received from the light incident portion to a direction different from a direction of light incidence.

17. The display device as claimed in claim 12, wherein the control unit controls intensity of current to the light emitting device module such that quantities of the light incident on the light guide plate are the greatest at both ends of the light guide plate.

18. A backlight unit, comprising:
a bottom cover;
a plurality of light emitting device assemblies,
   wherein each of the light emitting device assemblies has a light emitting device module including at least one light emitting device, and
   wherein the light emitting device assemblies are arranged in a matrix having a plurality of columns and a plurality of rows on the bottom cover;
a power supply unit configured to supply power to the light emitting device module; and
a control unit configured to control the power supply unit,
   such that, in the light emitting device assembly, intensity of current supplied to the light emitting device positioned at an edge region of the light emitting device assembly is different from intensity of current supplied to a light emitting device positioned at a middle region of the light emitting device assembly, wherein a plurality of light emitting devices is grouped as a light emission unit, and
   such that in the plurality of the light emitting device assemblies, an intensity of current to the light emission units in the light emitting device module of at least one light emitting device assembly arranged at an outermost column and at a lowest row is greater than an intensity of current to any of the other light emission units.

* * * * *